Patented Aug. 26, 1924.

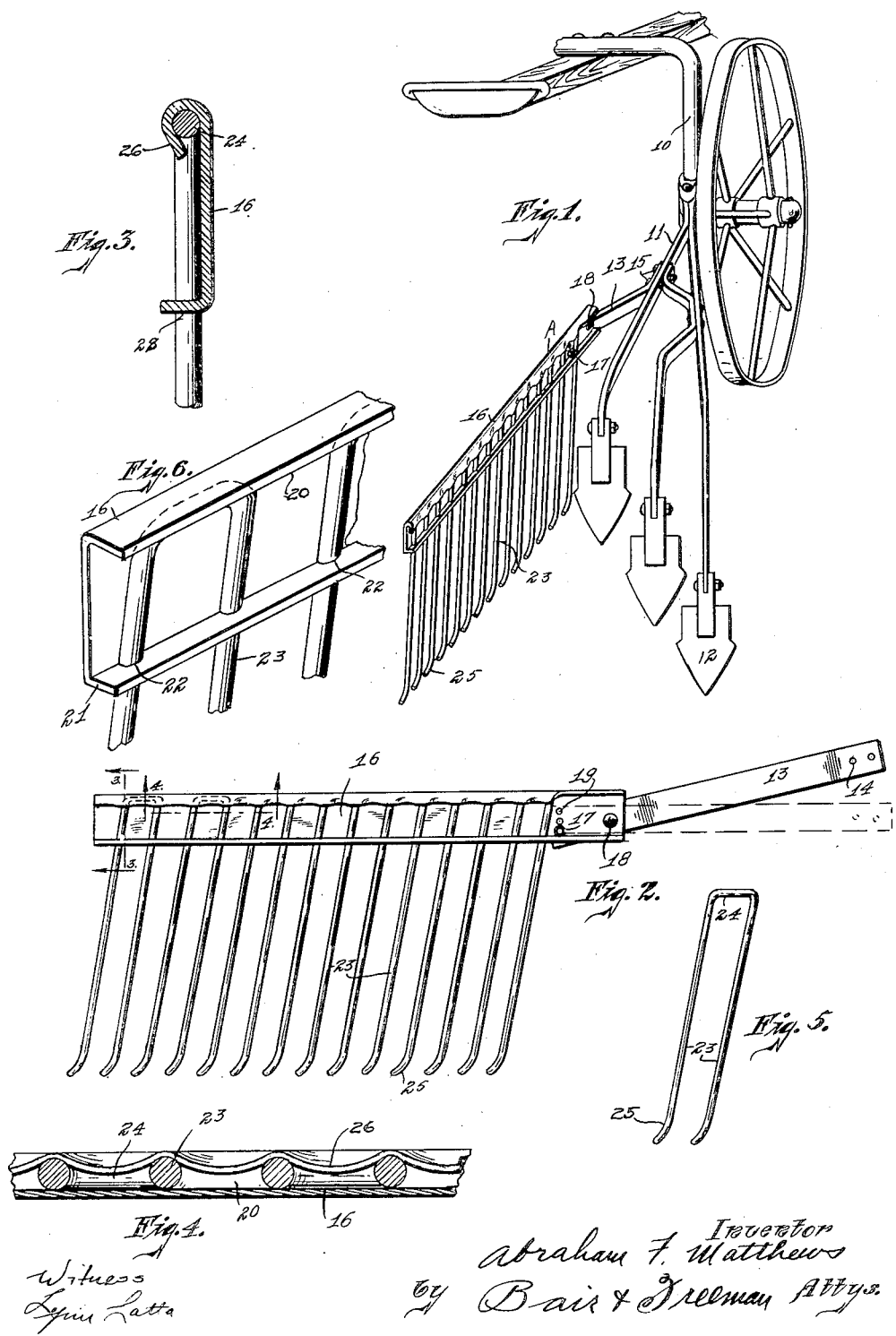

1,506,496

UNITED STATES PATENT OFFICE.

ABRAHAM F. MATTHEWS, OF POCAHONTAS, IOWA.

FENDER ATTACHMENT FOR CULTIVATORS.

Application filed March 12, 1923. Serial No. 624,400.

*To all whom it may concern:*

Be it known that I, ABRAHAM F. MATTHEWS, a citizen of the United States, and a resident of Pocahontas, in the county of Pocahontas and State of Iowa, have invented a certain new and useful Fender Attachment for Cultivators, of which the following is a specification.

The object of my invention is to provide a fender attachment for cultivators and the like, which is simple in construction, durable, and which can be manufactured at a comparatively low cost thereby enabling it to be easily marketed.

More particularly, my invention relates to fender attachments adapted to be fixed to the gang frames of a cultivator, the fender attachment being provided with a plurality of resilient fingers which engage the ground adjacent to the corn rows for thoroughly pulverizing the ground and for covering weeds and the like adjacent to the corn rows.

A still further object is to provide a channel iron or steel frame to which the resilient fingers may be easily and positively anchored thereto.

Still another object is to provide novel means for anchoring the resilient fingers to the channel iron frame.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a perspective view of a portion of a cultivator with my improved fender attachment shown thereon.

Figure 2 is an enlarged side view of the fender attachment.

Figure 3 is an enlarged detail, sectional view taken on line 3—3 of Figure 2.

Figure 4 is an enlarged detail, sectional view taken on line 4—4 of Figure 2.

Figure 5 is a view of one pair of the resilient fingers used in my fender attachment; and Figure 6 is an enlarged detail, perspective view of a portion of the channel iron frame with the resilient fingers shown therein before they are anchored to the frame.

In the accompanying drawings I have used the reference numeral 10 to indicate generally a cultivator which is provided with gangs 11 and cultivator blades 12. In the drawings, I have shown one of the gangs and one of the fender attachments, but it will be understood that the fender attachments are made in rights and lefts.

The fender attachments are fixed to the gang frames 11. Each of my fender attachments includes a bar 13 which is provided with openings 14 at its forward end, through which are inserted bolts 15 for anchoring the bar 13 to the gangs 11.

A channel iron frame 16 is secured to the bar 13 by means of the bolts 17 and 18. The channel iron frame 16 is provided with a number of openings 19, any one of which may selectively receive the bolt 17.

The bolt 18 serves as a pivot, thereby enabling the bar 13 to be swung to the position shown in dotted lines in Figure 2 of the drawings, and then locked in that position by inserting the bolt 17 in the proper opening 19.

The object of making the parts adjustable relative to each other is to permit the changing of the position of the fender attachment when necessary.

The channel iron frame 16 includes the upper flange 20 and a lower flange 21. The lower flange 21 is provided with a plurality of openings 22 equally spaced from each other.

Resilient fingers 23 are provided which are arranged in pairs and are connected together at their upper ends by the connecting portion 24. The resilient fingers 23 extend downwardly and rearwardly and have their lower ends curved, as at 25, so that the curved ends engage the ground and will travel thereover in runner-like fashion.

The providing of resilient fingers with curved ends permits the attachment to easily travel over uneven surfaces.

The fingers 23 are extended through the openings formed in the flange 21, as clearly shown in Figure 6 of the drawings.

The connecting portion 24 of the resilient fingers rests or abuts against the underside of the upper flange 20 of the channel iron frame 16.

The upper flange 20 of the channel iron frame 16 is bent over the connecting portion 24 of the resilient fingers 23, as at 26. The bending of the flange 20 positively anchors the finger members to the frame 16. The flange 20 is also bent over between the pairs of fingers 23. In Figure 6 of the drawings, I have shown the flange 20 just before it is bent over to engage the connecting portions 24.

It will be seen that the finger members 23 may be easily projected through the openings 22, and then by bending over the flange 20 they can be securely fixed to the frame 16.

It will be noted that I have provided a very efficient and cheap manner of mounting the resilient fingers on a frame. The employing of a channel iron frame gives me a very rigid construction for the fender attachment.

My present fender attachment is an improvement over my United States Letters Patent issued April 18, 1922, Number 1,413,127.

Some changes may be made in the construction and arrangement of the various parts of my invention, without departing from the real spirit and purpose of my invention and it is my intention to cover by my claim, any modified forms of structure or use of mechanical equivalents, which may be reasonably included within its scope.

I claim as my invention:

A pair of fender attachments for cultivators and the like, each comprising a channel iron frame fixed at one end to the gang of the cultivator and extended rearwardly therefrom, a plurality of inverted U-shaped members mounted in said frame at their connecting portion, said channel iron frame having a plurality of openings in one of its flanges through which the inverted U-shaped members are extended, the other flange of the channel iron frame being bent over the connecting portion of said inverted U-shaped members for anchoring them to said frame and the flange being bent over between the inverted U-shaped members as specified.

Des Moines, Iowa, February 28, 1923.

ABRAHAM F. MATTHEWS.